United States Patent [19]

Schultz, Sr.

[11] Patent Number: 5,524,797

[45] Date of Patent: Jun. 11, 1996

[54] DOUBLE ACTING METERING CYLINDER

[75] Inventor: Carl L. Schultz, Sr., Plymouth, Mich.

[73] Assignee: Sealant Equipment and Engineering, Inc., Plymouth, Mich.

[21] Appl. No.: 346,018

[22] Filed: Nov. 29, 1994

[51] Int. Cl.⁶ .................................................. G01F 11/30
[52] U.S. Cl. ........................................ 222/334; 222/504
[58] Field of Search ............................. 222/63, 135, 137, 222/249, 250, 334, 318, 330, 387, 388, 389, 504

[56] References Cited

U.S. PATENT DOCUMENTS

| | | | |
|---|---|---|---|
| 2,238,747 | 4/1941 | Ornstein | 210/40 |
| 2,870,776 | 1/1959 | Marsh | 137/99 |
| 2,883,996 | 4/1959 | Blewett et al. | 137/100 |
| 2,974,121 | 3/1961 | Salensky | 260/47 |
| 3,097,764 | 7/1963 | Loeser | 222/55 |
| 3,216,627 | 11/1965 | Best et al. | 222/334 |
| 3,530,873 | 9/1970 | Arp et al. | 137/99 |
| 3,802,605 | 4/1974 | Standlick | 222/134 |
| 3,876,145 | 4/1975 | Gusmer et al. | 239/112 |
| 3,908,862 | 9/1975 | Chandra et al. | 222/63 |
| 4,131,395 | 12/1978 | Gusmer et al. | 417/271 |
| 4,154,368 | 5/1979 | Gusmer et al. | 222/135 |
| 4,170,440 | 10/1979 | Gusmer et al. | 417/426 |
| 4,199,303 | 4/1980 | Gusmer et al. | 417/216 |
| 4,279,360 | 7/1981 | Hauser | 222/63 |
| 4,312,463 | 1/1982 | Daby | 222/134 |
| 4,377,256 | 3/1983 | Commette et al. | 239/117 |
| 4,391,291 | 7/1983 | Hume | 137/99 |
| 4,494,676 | 1/1985 | Berweger | 222/63 |
| 4,523,696 | 6/1985 | Commette et al. | 222/135 |
| 4,565,511 | 1/1986 | Ramisch | 425/146 |
| 5,004,351 | 4/1991 | Salaba et al. | 366/152 |
| 5,143,296 | 9/1992 | Saurwein et al. | 239/415 |

FOREIGN PATENT DOCUMENTS 9325465  12/1993  WIPO .................................. 222/249

*Primary Examiner*—Andres Kashnikow
*Assistant Examiner*—Philippe Derakshani
*Attorney, Agent, or Firm*—Basile and Hanlon

[57] ABSTRACT

The invention relates to a double acting metering and dispensing apparatus for high viscosity materials having a cylinder and a piston reciprocally movable within the cylinder having a charging and discharging stroke and forming proportioning expandable and contractible chambers such that for every stroke of the piston, a measured amount of viscous material is dispensed to the appropriate dispensing area.

8 Claims, 2 Drawing Sheets

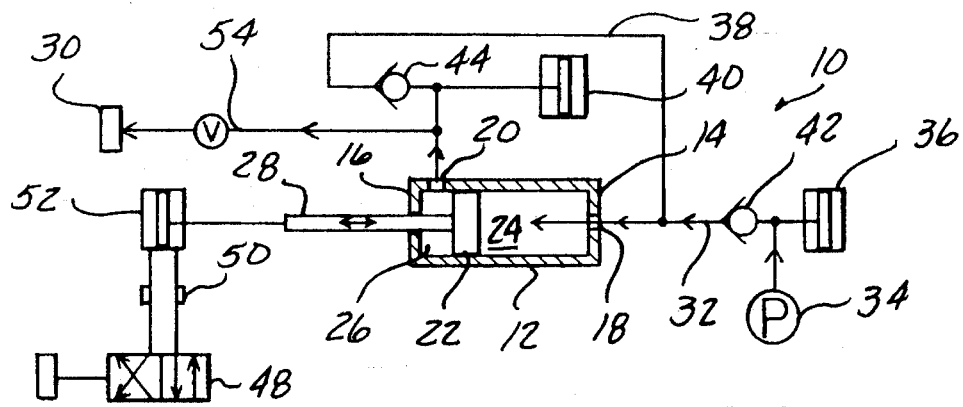
FIG·1
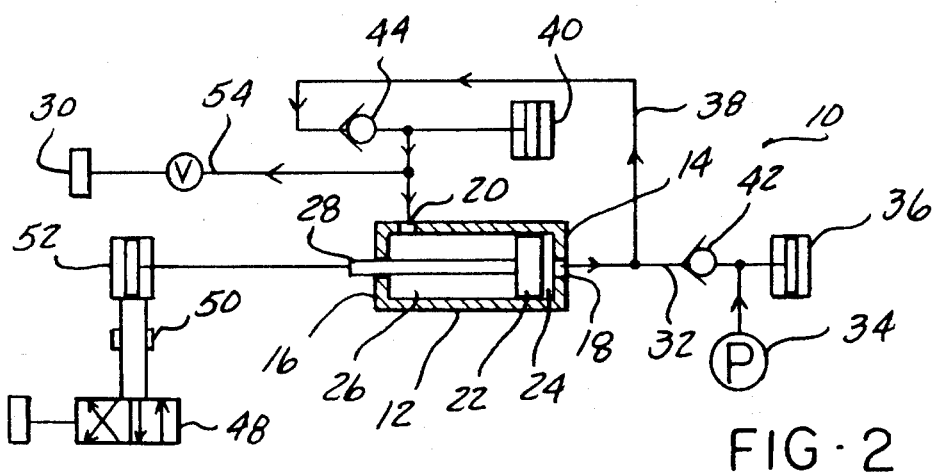
FIG·2
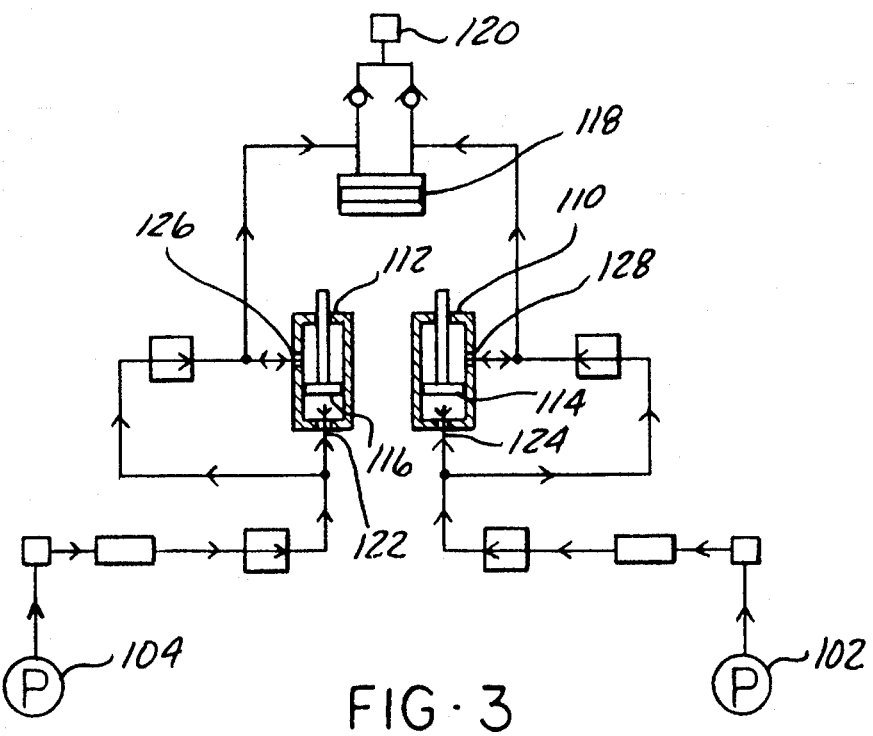
FIG·3

DOUBLE ACTING METERING CYLINDER

FIELD OF THE INVENTION

The invention is a metering apparatus for viscous material.

BACKGROUND OF THE INVENTION

In many chemical operations and in various other industries, including liquid injection molding, mixing single or multiple viscous materials in predetermined quantities is a required procedure. As required by these procedures, the viscous material must be metered continuously at a steady rate. In the case where a continuous flowing stream is desired, in particular, if exact proportions are required, the apparatus can be very expensive and complicated.

SUMMARY OF THE INVENTION

The purpose of the invention is to provide a double acting, positive displacement metering apparatus for accurately and uniformly providing a measured viscous material to an appropriate dispensing unit at a constant volumetric flow. According to the invention, the apparatus comprises a cylinder within a housing having a fluid tight piston capable of reciprocating movement within the cylinder. The piston forms two chambers within the cylinder housing. The cylinder has apertures proximate to each end of the cylinder housing for access to and from the two chambers. The reciprocating movement of the piston within the cylinder housing alternates between a charging and discharging of fluid into the chambers. An air valve having pressure regulated outlets controls the reciprocal movement of a prime mover, such as an air cylinder, which in turn controls the reciprocal movement of the piston within the cylinder housing. The chambers are configured such that a first chamber provides twice the capacity as the second chamber when fully expanded, so that with every discharging stroke of the piston, a quantity '2X' exits the contracting first chamber wherein 'X' of the fluid material enters the expanding second chamber and the other 'X' of the fluid material exits to the appropriate dispensing unit. With every charging stroke of the piston, the first chamber expands and refills with a quantity of '2X' thereby forcing the 'X' quantity in the contracting second chamber to exit to the appropriate dispensing unit. Therefore, with every stroke of the piston, a measured quantity 'X' is discharged to the dispensing unit.

A programmable logic controller controls an inlet valve for the first chamber and an outlet valve for the second chamber. The programmable logic controller assures that the opening and closing of the valves coordinate with the movement of the piston. The valves are sequenced by the programmable logic controller to prevent both valves being open simultaneously, wherein there is an open conduit leading from the supply directly to the mixer. Therefore, the programmable logic controller prevents a straight (unmetered) condition. The metering apparatus comprising the double acting, positive displacement, metering cylinder of the present invention is particularly advantageous for accurately metering liquid resins such as epoxy and liquid at the desired volumetric proportions.

Other objects, advantages and applications of the present invention will become apparent to those skilled in the art when the following description of the best mode contemplated for practicing the invention is read in conjunction with the accompanying drawings.

BRIEF DESCRIPTION OF DRAWINGS

The description herein makes reference to the accompanying drawings wherein like reference numerals refer to like parts throughout the several views, and wherein:

FIG. 1 is a schematic illustration of the metering apparatus of the present invention employing a single double acting, positive displacement, metering cylinder indicating the flow of fluid when an inlet valve is open;

FIG. 2 is a schematic illustration of the metering apparatus of the present invention employing a single double acting, positive displacement, metering cylinder indicating the flow of fluid when an outlet valve is open;

FIG. 3 is a schematic illustration of the metering apparatus of the preferred embodiment employing two double acting metering cylinders and a dispensing unit.

DESCRIPTION OF THE PREFERRED EMBODIMENT

Figure 4:
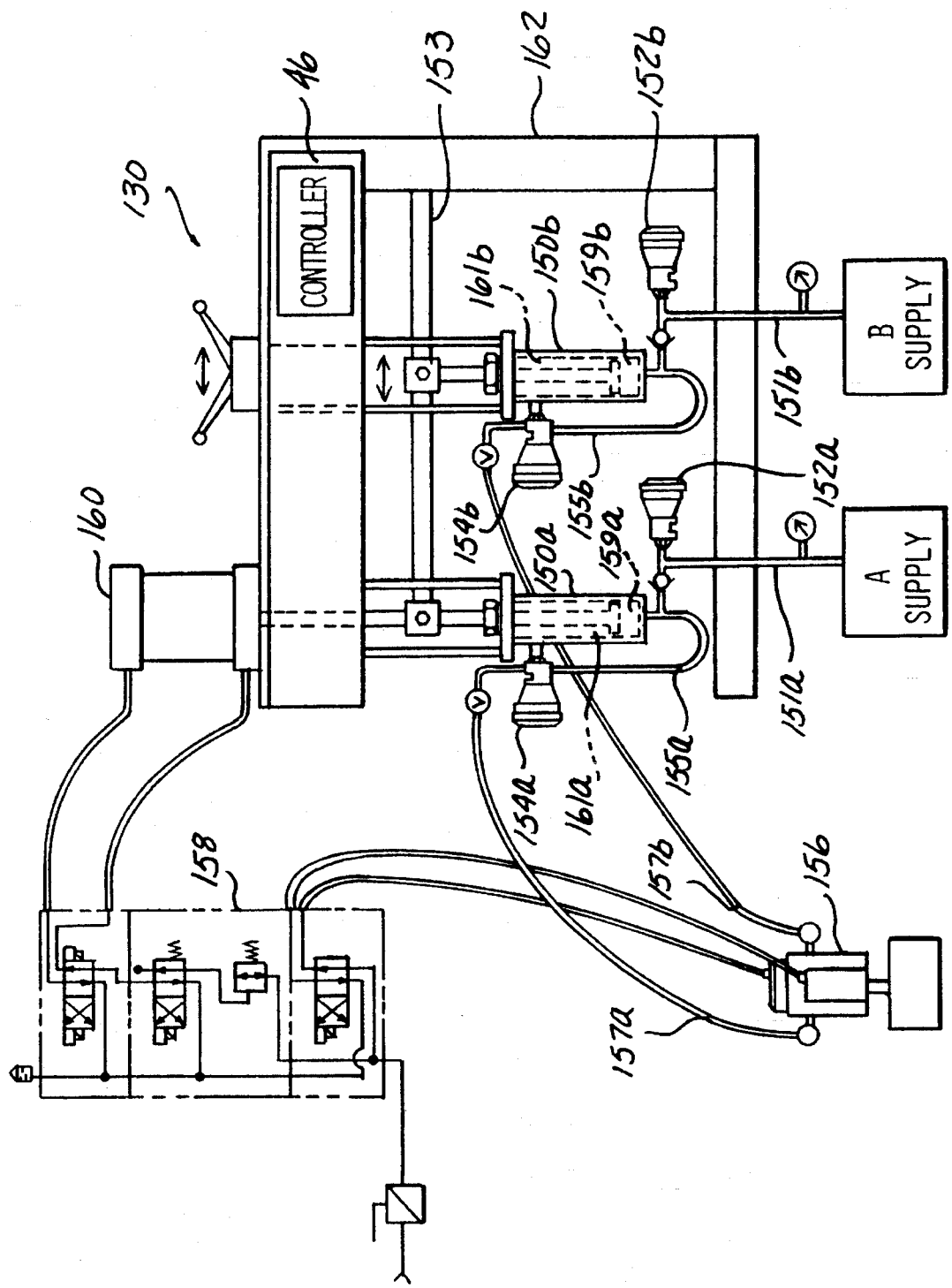
FIG. 4 is a preferred embodiment of the apparatus having two individual double acting metering cylinders wherein each is routed directly to a dispensing unit.

Referring to FIG. 1, the double acting, positive displacement, metering apparatus 10 is shown comprising a double acting metering cylinder housing 12 having a pair of ends 14, 16 and ports 18, 20, respectively, formed proximate to or at each end. A fluid tight piston 22 is mounted within the cylinder housing 12 for reciprocal sliding movement and thereby forming a pair of expandable chambers 24, 26 on either side of piston 22. The piston has a rod 28 connected to one side of piston 22 and extending through one expandable chamber 26. The rod 28 and piston 22 are dimensioned within the cylinder housing 12 such that the first chamber 24 of the cylinder housing 12 has a capacity twice the capacity of the second chamber 26 when each chamber is at its maximum capacity.

To alternately charge and discharge fluid to and from both chambers, simultaneously, the apparatus 10 comprises a system of fluid transmitting conduits and valves. Cylinder housing 12 together with the transmitting conduits and valves provide an apparatus 10 that accurately meters a fluid to an appropriate dispensing unit 30. The fluid transmitting conduits include a fluid supply line 32 connected to a supply of material located in a proper receptacle 34 and having an associated pump 34. Supply line 32 is connected to the cylinder housing 12 and fluidly connected to the port 18 of the first chamber 24, a two-way, air operated valve 36 is interposed therein. The valve 36 is an on/off switch for inlet valve 42. In one position, valve 36 permits the fluid to flow into the first chamber 24, and in the opposite position prevents flow to first chamber 24. The fluid transmitting conduits also include a cross-over line 38 fluidly connected to the first port 18 for discharging fluid from the first chamber 24 to direct a portion of fluid into the second chamber 26 and a portion of the fluid material to the dispensing unit 30. A second two-way, air operated valve 40 is interposed therein and is virtually identical to the first valve 36. Valve 40 is an on/off switch for outlet valve 44. In one position, valve 40 permits the fluid to flow into the second chamber 26, and in the opposite position prevents flow to second chamber 26. The first and second two-way valves 36, 40, respectively, control the opening and closing of inlet and outlet valves 42, 44 by way of a programmable logic controller control unit 46 (as shown in FIG. 4). The inlet 42 and outlet 44 valves are controlled by programmable logic controller 46 such that the inlet valve 42 is always closed when the outlet valve 44 is opened and the outlet valve 44 is closed when the inlet valve 42 is open. The inlet valve 42 allows the flow of the material to be pumped from the supply reservoir 34 and into the first chamber 24 of the cylinder housing 12. The outlet valve 44 allows the flow of the material to be discharged from the first chamber 24 into the cross-over line 38 and directed to the second chamber 26. The inlet and outlet valves 42, 44 may change from one position to another simultaneously, or there maybe an elapsed delay time before opening one valve after the other valve has closed. The operation of inlet and outlet valves 42 and 44 are program controlled by controller 46 and are dependent upon the dispensing or process requirements at dispensing unit 30. Programmable logic controller 46 also controls the opening and closing of inlet and outlet valves 42, 44 so that inlet valve 42 is open and valve 44 is closed when piston 22 is in the charging position (FIG. 1); and inlet valve 42 is closed and valve 44 is open when piston 22 is in the discharging position (FIG. 2). A four-way air valve 48 in line with dual air regulators 50 and an air cylinder 52 control the charge and discharge of piston 22 within the double acting metering cylinder housing 12.

The apparatus of the present invention provides a metered portion of fluid material to be continuously and uniformly discharged to the dispensing unit 30 with each stroke of piston 22. For example purposes, if a metered quantity 'X' is required to be discharged at a constant and uniform rate, a piston 22, rod 28 and cylinder housing 12 combination would be employed that is calibrated so that the maximum capacity of the first chamber 24 is '2X' and the maximum capacity of the second chamber 26 is 'X' where 'X' is the predetermined metered discharge to the dispensing unit 30. A quantity of '2X' material is injected into the first chamber 24 during the charging stroke of the piston 22. FIG. 1 illustrates the charging stroke of the piston 22, wherein the first chamber 24 is at its maximum capacity; and the rod 28 is retracted from the second chamber 26. During the charging strokes, a quantity 'X' previously stored in the second chamber 26 is metered to the appropriate dispensing unit 30 through a dispensing line 54. The dispensing line 54 is fluidly connected to port 20 of the second chamber 26 and to the cross-over line 38. The action of piston 22 ejects the stored quantity 'X' out of the second chamber 26, through port 20, and dispensing line 54 to dispensing unit 30.

FIG. 2 illustrates the discharging stroke of the piston 22, wherein the rod 28 extends into the second chamber 26 to cause second chamber 26 to expand to its maximum capacity. The '2X' quantity of viscous material stored in chamber 24 is ejected as first chamber 24 contracts by the action of the piston 22. The '2X' quantity of viscous material flows through port 18 and into cross-over line 38. One 'X' quantity enters port 20 of the second chamber 26. The other 'X' quantity is metered to the dispensing unit 30.

In practice, the inlet valve 42 opens simultaneously as the outlet valve 44 closes. When inlet valve 42 is open, the pump 34 directs viscous material through the supply line 32 to port 18 of the first chamber housing 24 in cylinder 12. The viscous material cannot be directed into the cross-over line 38 when the outlet valve 44 is closed. The four-way valve 48, during the charging stroke of the piston, controls the reciprocal movement of air cylinder 52 which in turn activates the piston 22 to move away from port 18 thereby increasing the capacity of the first chamber 24. A quantity '2X' of viscous material enters the first chamber 24 during the charging stroke of the piston 22. At the same time, the action of piston 22 ejects the 'X' quantity of viscous material stored in chamber 26, through port 20 and dispensing line 54 to the dispensing unit 30.

During the discharging stroke of piston 22, the programmable logic controller 46 closes the inlet valve 42 and opens the outlet valve 44 in sequence so that the pump 34 cannot direct viscous material directly from supply/pump 34 through the cross-over line 38 to the dispensing unit 30. The four-way valve 48 activates air cylinder 52 to return the piston 22 toward the port 18, thereby forcing the viscous material through cross-over line 38. One 'X' of the measured material is dispensed into second chamber 26 and the other 'X' of the measured material is sent toward the appropriate dispensing unit 30 or application.

The next and subsequent charging strokes, the inlet valve 42 again is open and the outlet valve 44 is closed by the programmable logic controller 46. Viscous material is pumped into the first chamber 24 as the first chamber 24 expands when piston 22 is in the charging stroke. While the first chamber 24 is expanding, the second chamber 26 is contracting as the piston 22 moves toward second port 20 forcing the remaining 'X' of the material to the appropriate dispensing unit 30. This procedure therefore provides a measured amount of viscous material being dispensed to the appropriate dispensing application for every stroke of the piston 22.

FIG. 3 schematically illustrates how the invention may be used to precisely meter multiple viscous materials from individual supply sources 102, 104 into a mixer or a dispensing unit 120. Each double acting metering cylinder 110, 112, respectively, houses a piston 114, 116 and has expandable and contractible chambers therein. One cylinder and piston can be designed and programmed to meter an appropriate 'X' amount to the mixer 120, while the other cylinder and piston can be designed and programmed to meter an appropriate 'Y' amount to mixer 120 for proper mixing proportions before dispensing to the proper application. A common air cylinder 118 activates each piston 114, 116; to open and close ports 122 and 124 simultaneously, and to open and close ports 126 and 128 simultaneously. The programmable logic controller 46 coordinates the discharge of the individual viscous material from the individual cylinders 110, 112 to meet the requirements of the mixer 120.

FIG. 4 illustrates the preferred embodiment of the double acting, positive displacement metering apparatus 130 having two double acting metering cylinders 150a, 150b. Metering cylinder 150a is fixedly attached along fulcrum bar 153 to a power head assembly 160. Metering cylinder 150b is slidably attached to fulcrum bar 153 for reasons discussed below. During the charging strokes, two supplies, A and B, are pumped through fluid supply lines 151a, 151b, respectively. Inlet valves 152a, 152b, preferably high pressure carbide fluid control valves, are open to allow a '2X' amount of material A and '2Y' amount of material B into their designated first chambers 159a, 159b, while valves 154a, 154b, which are also preferably high pressure carbide fluid control valves are closed to prevent materials A and B from entering cross-over lines 155a, 155b and the respective second chambers 161a, 161b. During the discharging stroke, inlet valves 152a, 152b close simultaneously wherein outlet valves 154a, 154b are opened. The '2X' amount of material A is discharged through cross-over line 155a, allowing 'X' amount to continue through a dispensing line 157a to the dispensing unit 156. The other 'X' amount is stored in the second chamber 161a of cylinder 150a. Likewise during the discharging stroke '2Y' amount of B travels through cross-over line 155b, allowing 'Y' amount to continue through dispensing line 157b to the dispensing unit 156. The other 'Y' amount is stored in the second chamber 161b of cylinder 150b.

During the charging stroke, as the first chambers 159a, 159b are being filled, the stored material 'X' and 'Y' from the second chambers 161a, 161b are ejected through dispensing lines 157a, 157b to the dispensing unit 156. Therefore, every stroke of the piston results in a metered portion of supplies A and B being dispensed to the dispensing unit 156. Each stroke of the pistons in cylinders 150a and 150b is regulated by a four-way air valve 158 that is plumbed to the power head assembly 160 and controlled by the programmable logic controller 46. The four-way air valve may also be used to regulate the dispensing unit 156. The dispensing unit 156 can be a mixer, dispensing gun, or any other application where it is required to have a continuous and uniform metered flow of viscous material.

It is intended that the amounts of 'X' and 'Y' used for illustration may be any required amount. The amounts 'X' and 'Y' can be adjusted by changing the diameter of cylinders 150a and 150b respectively. In addition, the 'Y' amount from cylinder 150b can be proportionally varied to a specific ratio of the 'X' amount by sliding cylinder 150b along fulcrum bar 153, as indicated by the arrows of FIG. 4. As cylinder 150b moves away from cylinder 150a and toward vertical base 162, the ratio of B to A decreases. As cylinder 150b moves toward cylinder 150a, the ratio of B to A increases. It is further intended that the double acting, positive displacement metering apparatus 130 can be used as a single material meter device using cylinder 150a only, as well as a multi-material metering device using both cylinders 150a and 150b.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A metering apparatus to continuously provide a quantity of a viscous material to an appropriate dispensing unit comprising:

a cylinder having a fluid tight reciprocal piston disposed therein, said piston forming a pair of expandable and contractible chambers in the cylinder, the first chamber communicating to a supply source of viscous material, the second chamber communicating to the dispensing unit; and a conduit exterior to the cylinder fluidly connecting the first chamber and the second chamber, said piston having a charging stroke wherein a quantity of viscous material flows into the first chamber, and a discharging stroke wherein a portion of the quantity flows from the first chamber to the second chamber, and another portion flows from the first chamber to the dispensing unit.

2. A metering apparatus to continuously provide an predetermined metered quantity of a viscous material to an appropriate dispensing unit said apparatus comprising:

a cylinder having a fluid tight reciprocal piston disposed therein, said piston forming a pair of expandable and contractible chambers in the cylinder, said first chamber having a capacity twice the capacity of the second chamber, said second chamber having a capacity equal to the predetermined metered quantity of material delivered to the dispensing unit;

said piston having a charging stroke wherein the viscous material flows into the first chamber and having a discharging stroke wherein the viscous material flows out of the first chamber;

a power means operable for delivering twice the predetermined metered quantity of viscous material to the first chamber during the charging stroke;

a conduit fluidly connecting the first chamber and the second chamber; and means for fluidly connecting the apparatus to the dispensing unit, wherein the predetermined metered quantity of viscous material flows to the appropriate dispensing unit for every charging stroke and discharging stroke of the piston.

3. The apparatus of claim 2 further comprising means for opening and closing the conduit connecting the first and second chambers.

4. The apparatus of claim 2 further comprising an inlet valve and an outlet valve, wherein the inlet valve is open during the charging stroke wherein the viscous material enters the first chamber, and the outlet valve is open during the discharging stroke wherein viscous material enters the second chamber.

5. The apparatus of claim 4 further comprising a control means for opening and closing the inlet valve and outlet valve in a predetermined sequence to prevent an unmetered material discharge.

6. The apparatus of claim 5 further comprising a drive means for reciprocally moving the piston within the cylinder.

7. The apparatus of claim 4 wherein the inlet valve and outlet valve are high pressure carbide fluid control valves.

8. A metering apparatus to continuously provide predetermined metered quantity of viscous material to an appropriate dispensing unit, the apparatus comprising:

a cylinder having a fluid tight reciprocal piston disposed therein, said piston forming a pair of expandable and contractible chambers in the cylinder, the first chamber communicating to a supply source of viscous material and having a capacity twice the capacity of the second chamber, said second chamber communicating to the dispensing unit and having a capacity equal to the predetermined metered quantity;

a power means operable for delivering twice the metered quantity of viscous material to the first chamber;

a conduit exterior to the cylinder fluidly connecting the first chamber and the second chamber;

said piston having a charging stroke wherein the first chamber expands to accept delivery of twice the predetermined metered quantity of viscous material therein, and the second chamber contracts to eject a predetermined metered quantity of viscous material stored therein for delivery to the dispensing unit; and said piston having a discharging stroke wherein the first chamber contracts to eject the entire quantity of viscous material stored therein, wherein a portion equal to the predetermined metered quantity flows to the dispensing unit and another portion equal to the predetermined quantity flows to the second chamber.

* * * * *